United States Patent
Dherde et al.

(10) Patent No.: US 10,753,669 B2
(45) Date of Patent: Aug. 25, 2020

(54) HINGE SUPPORT ASSEMBLY FOR A VACUUM INSULATED APPLIANCE CABINET

(71) Applicant: WHIRLPOOL CORPORATION, Benton Harbor, MI (US)

(72) Inventors: Eric J. Dherde, St. Joseph, MI (US); Michael A. Fiori, Stevensville, MI (US); Lynne F. Hunter, Dorr, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/087,125

(22) PCT Filed: May 3, 2016

(86) PCT No.: PCT/US2016/030547
§ 371 (c)(1),
(2) Date: Sep. 21, 2018

(87) PCT Pub. No.: WO2017/192121
PCT Pub. Date: Nov. 9, 2017

(65) Prior Publication Data
US 2019/0101320 A1 Apr. 4, 2019

(51) Int. Cl.
*F25D 23/02* (2006.01)
*F25D 23/06* (2006.01)
(Continued)

(52) U.S. Cl.
CPC ......... *F25D 23/028* (2013.01); *F25D 23/065* (2013.01); *F25D 23/085* (2013.01);
(Continued)

(58) Field of Classification Search
CPC .... F25D 23/065; F25D 23/082; F25D 23/085; F25D 21/04; F25D 2201/14;
(Continued)

(56) References Cited

U.S. PATENT DOCUMENTS

| | | | |
|---|---|---|---|
| 2,639,592 A | 5/1953 | Philipp | |
| 3,632,012 A | 1/1972 | Kitson | |

(Continued)

FOREIGN PATENT DOCUMENTS

| | | | | |
|---|---|---|---|---|
| DE | 9114202 U1 * | 1/1992 | ........... | A47B 95/043 |
| DE | 9211008 U1 * | 1/1993 | ........... | F25D 23/082 |

(Continued)

*Primary Examiner* — Andrew M Roersma
(74) *Attorney, Agent, or Firm* — Price Heneveld LLP (57) ABSTRACT

An appliance includes a cabinet having an outer wrapper, an inner liner and a trim breaker defining a joint therebetween. The outer wrapper, inner liner and trim breaker define an insulating cavity. A vacuum insulated structure is disposed within the insulating cavity. A metallic frame is in communication with the outer wrapper and includes an upper hinge mount and a lower hinge mount that are connected by a vertical frame member. The metallic frame is at least partially disposed within the insulating cavity. A door panel is rotationally mounted to the cabinet via an upper hinge mounted to the upper hinge mount and a lower hinge mounted to the lower hinge mount.

8 Claims, 7 Drawing Sheets

(51) Int. Cl.
*F25D 23/08* (2006.01)
*F25D 21/04* (2006.01)

(52) U.S. Cl.
CPC .......... *F25D 21/04* (2013.01); *F25D 2201/14* (2013.01); *F25D 2323/021* (2013.01); *F25D 2323/024* (2013.01); *Y02B 40/34* (2013.01)

(58) Field of Classification Search
CPC .......... F25D 2323/06; F25D 2323/024; F25D 2400/02; F25D 2400/04
See application file for complete search history.

(56) References Cited

U.S. PATENT DOCUMENTS

| | | | | |
|---|---|---|---|---|
| 4,150,518 | A * | 4/1979 | Truesdell | F25D 21/04 |
| | | | | 220/592.08 |
| 4,330,310 | A * | 5/1982 | Tate, Jr. | F25D 21/04 |
| | | | | 312/407 |
| 4,606,112 | A * | 8/1986 | Jenkins | F25D 23/062 |
| | | | | 29/464 |
| 4,632,470 | A * | 12/1986 | Jenkins | F25D 23/062 |
| | | | | 29/525.12 |
| 5,666,764 | A * | 9/1997 | Beatty | F25D 23/028 |
| | | | | 16/254 |
| 5,897,181 | A * | 4/1999 | Avendano | F25D 23/062 |
| | | | | 29/525.11 |
| 6,178,763 | B1 * | 1/2001 | Brancheau | F25D 21/04 |
| | | | | 219/536 |
| 6,428,130 | B1 * | 8/2002 | Banicevic | F25D 21/04 |
| | | | | 312/296 |
| 6,725,624 | B2 * | 4/2004 | Hirath | F25D 23/062 |
| | | | | 52/309.8 |
| 7,014,283 | B2 * | 3/2006 | Grace | F25D 23/062 |
| | | | | 312/406 |
| 7,108,341 | B2 | 9/2006 | Myers et al. | |
| 8,057,144 | B2 * | 11/2011 | Johnson | F16B 19/1072 |
| | | | | 411/34 |
| 8,864,253 | B2 | 10/2014 | Gorz et al. | |
| 2011/0179816 | A1 * | 7/2011 | Andersson | F25D 21/04 |
| | | | | 62/277 |
| 2012/0038258 | A1 | 2/2012 | Park et al. | |
| 2013/0257256 | A1 * | 10/2013 | Allard | F25D 23/062 |
| | | | | 312/406 |
| 2014/0346942 | A1 | 11/2014 | Kim et al. | |
| 2015/0192356 | A1 | 7/2015 | Kang et al. | |
| 2019/0011174 | A1 * | 1/2019 | Dherde | E05D 15/266 |

FOREIGN PATENT DOCUMENTS

| | | | | |
|---|---|---|---|---|
| DE | 29504901 | U1 * | 5/1995 | ............ F25D 21/04 |
| DE | 102012223541 | A1 * | 6/2014 | ............ F25D 23/04 |
| EP | 2789945 | | 10/2014 | |
| JP | 2013119996 | A * | 6/2013 | ........... F25D 23/063 |
| KR | 20070041842 | | 4/2007 | |
| WO | 2012044001 | | 4/2012 | |
| WO | WO-2014103773 | A1 * | 7/2014 | ........... F25D 23/063 |
| WO | WO-2016056745 | A1 * | 4/2016 | ........... F25D 21/04 |

* cited by examiner

HINGE SUPPORT ASSEMBLY FOR A VACUUM INSULATED APPLIANCE CABINET

FIELD OF THE DEVICE

The device is in the field of insulation structures for appliances, and more specifically, a metallic frame incorporated as part of the insulation structure for supporting hinges for rotationally operable doors.

SUMMARY

In at least one aspect, an appliance includes a cabinet having an outer wrapper, an inner liner and a trim breaker defining a joint between the outer wrapper and inner liner. The outer wrapper, inner liner and trim breaker define an insulating cavity. A vacuum insulated structure is disposed within the insulating cavity. A metallic frame is in communication with the outer wrapper, wherein the metallic frame includes at least one upper hinge mount and at least one lower hinge mount that are connected by at least one vertical frame member, wherein the metallic frame is at least partially disposed within the insulating cavity. At least one door panel is rotationally mounted to the cabinet via an upper hinge mounted to the at least one upper hinge mount and a lower hinge mounted to the at least one lower hinge mount.

In at least another aspect, an appliance includes a cabinet having a metallic frame that defines a plurality of hinge mounts, an outer wrapper that is engaged with the metallic frame, an inner liner that cooperates with the outer wrapper to define an insulating cavity and a trim breaker that defines a joint between the inner liner and outer wrapper. The metallic frame is at least partially disposed within the insulating cavity and maintains the hinge mounts distal from the trim breaker, and wherein the metallic frame includes upper and lower lateral frames that are connected by a vertical frame member.

In at least another aspect, a cabinet structure of an appliance includes an outer wrapper. A metallic frame is disposed in at least partial engagement with the outer wrapper and defines a plurality of hinge mounts. A trim breaker engages the outer wrapper. The metallic frame is positioned to maintain the plurality of hinge mounts distal from the trim breaker. An inner liner cooperates with the outer wrapper and the trim breaker to define a hermetically sealed insulating cavity defining an at least partial vacuum, wherein the hinge mounts are at least partially disposed within the insulating cavity and are adapted to receive hinge fasteners and maintain the at least partial vacuum of the insulating cavity.

These and other features, advantages, and objects of the present device will be further understood and appreciated by those skilled in the art upon studying the following specification, claims, and appended drawings.

DETAILED DESCRIPTION OF EMBODIMENTS

Figure 1:
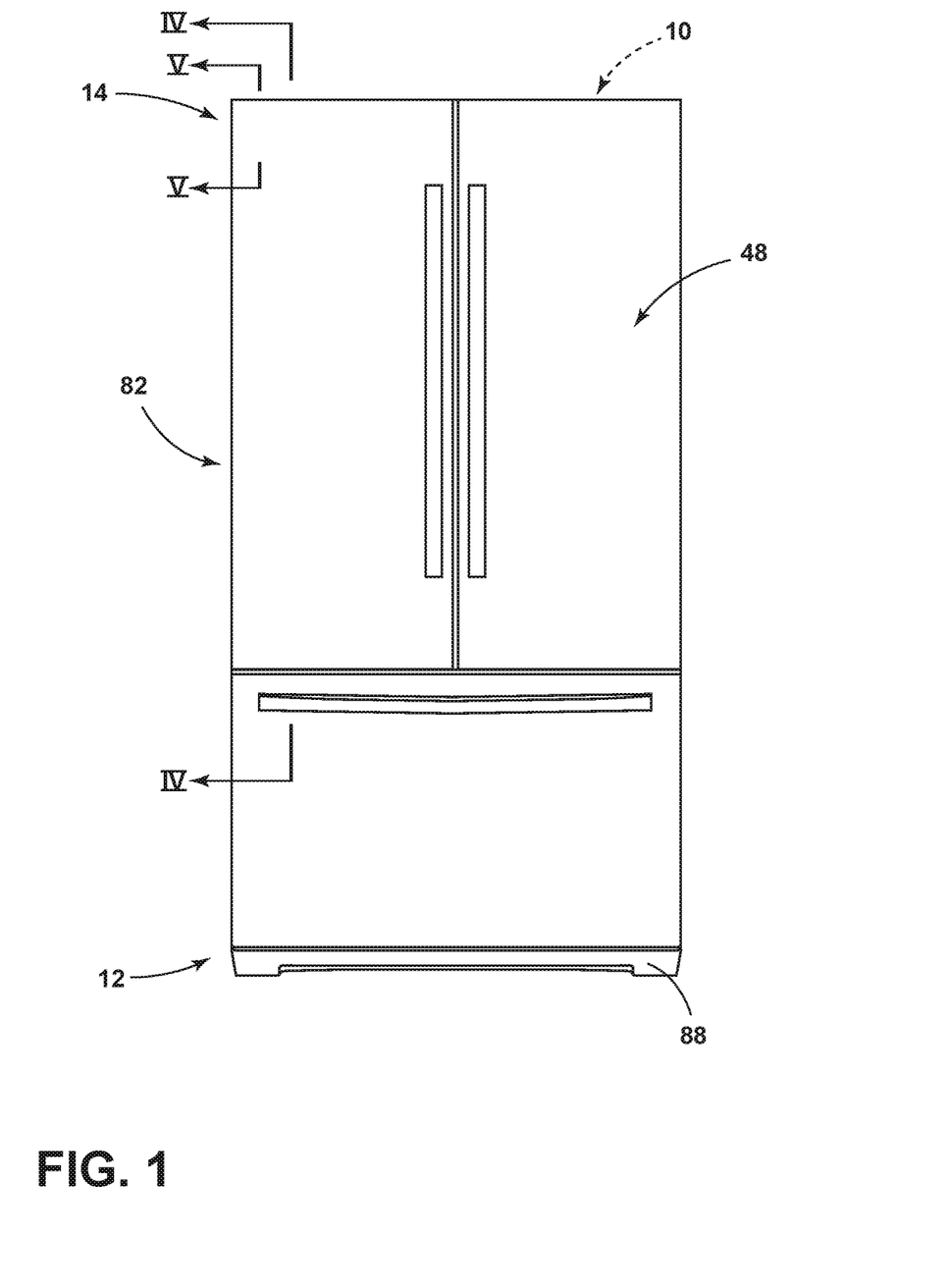
FIG. 1 is a front elevational view of an appliance incorporating an aspect of the hinge support frame with the doors in a closed position.
Figure 2:
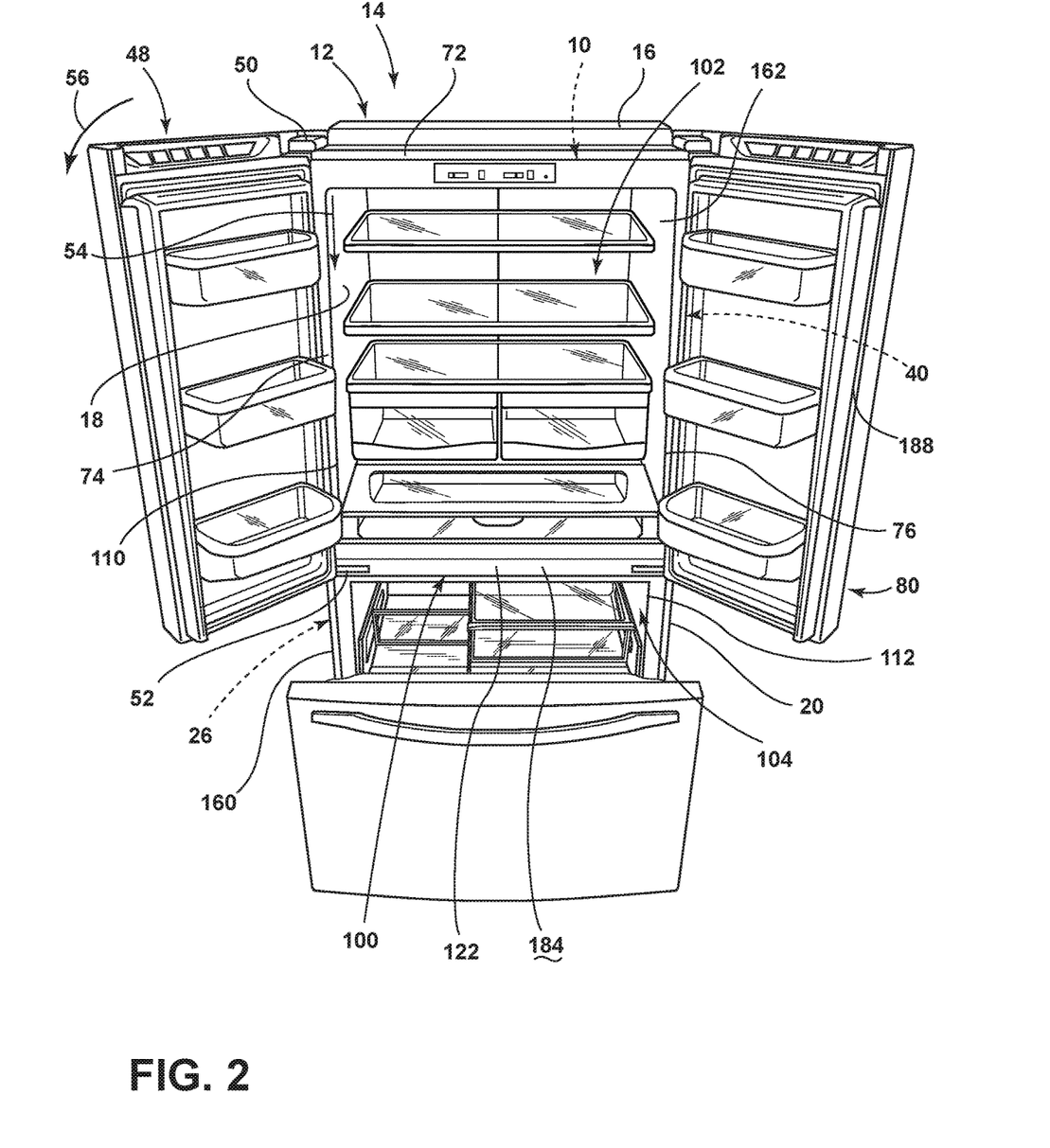
FIG. 2 is a front perspective view of the appliance of FIG. 1 with the doors in an open position.
Figure 3:
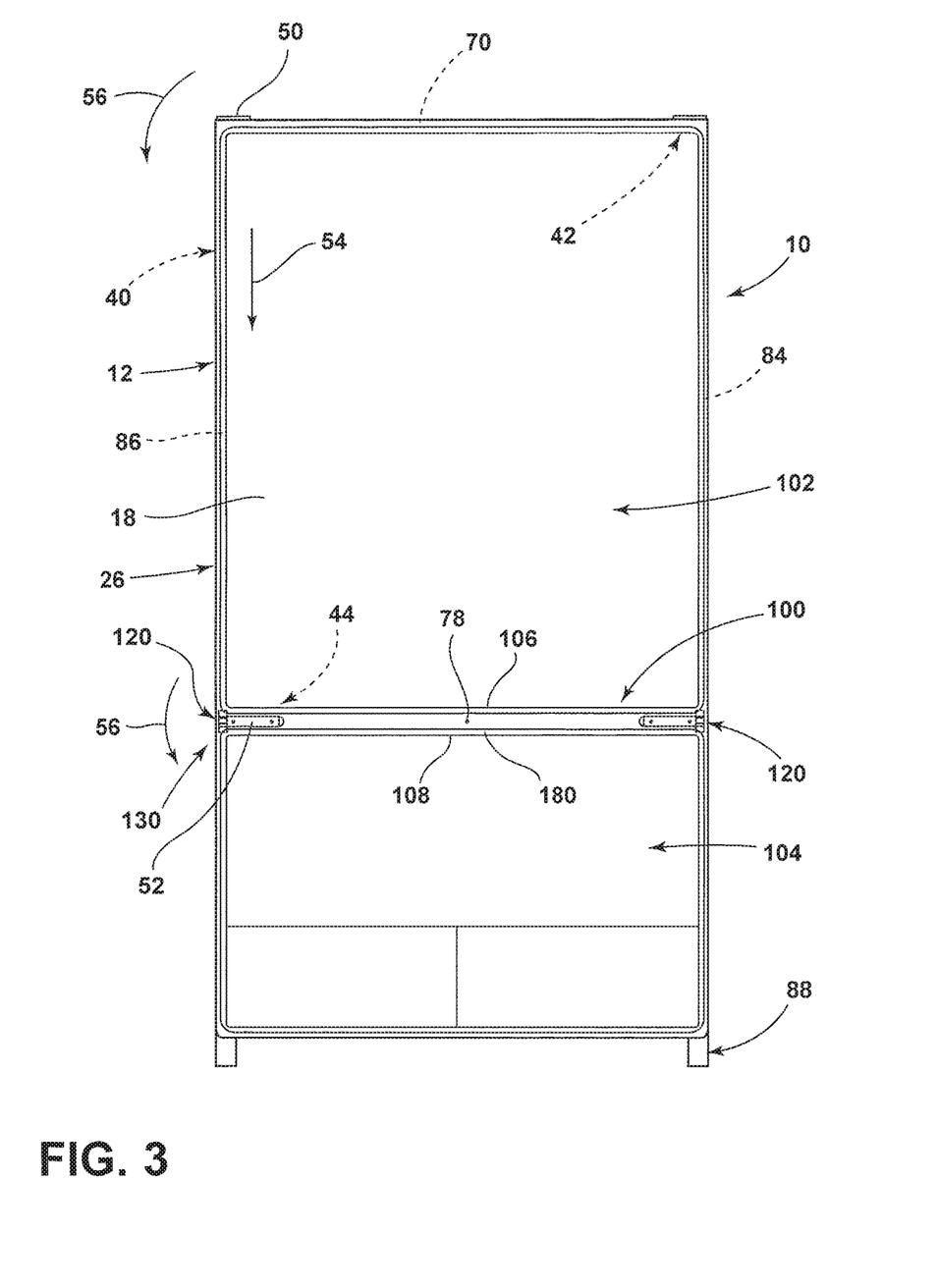
FIG. 3 is a front elevational view of an aspect of the hinge support frame incorporated as part of the cabinet structure of the appliance.
Figure 4:
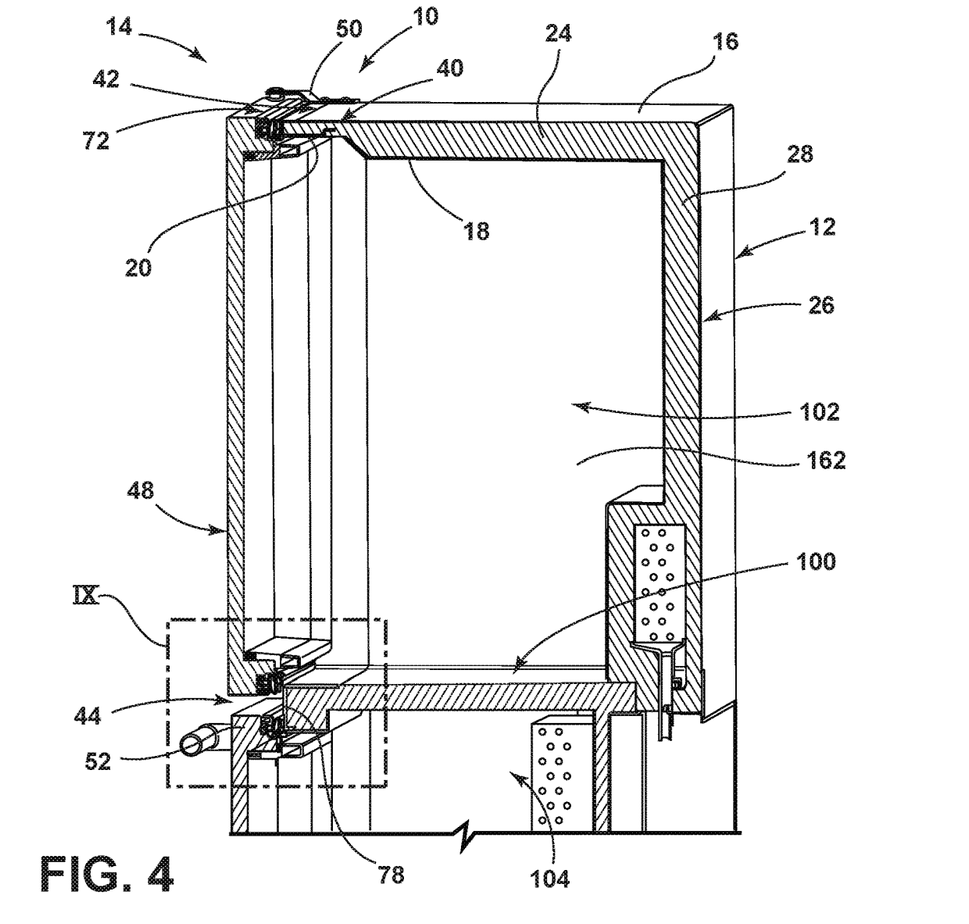
FIG. 4 is a cross-sectional view of the appliance of FIG. 1 taken along line IV-IV.
Figure 5:
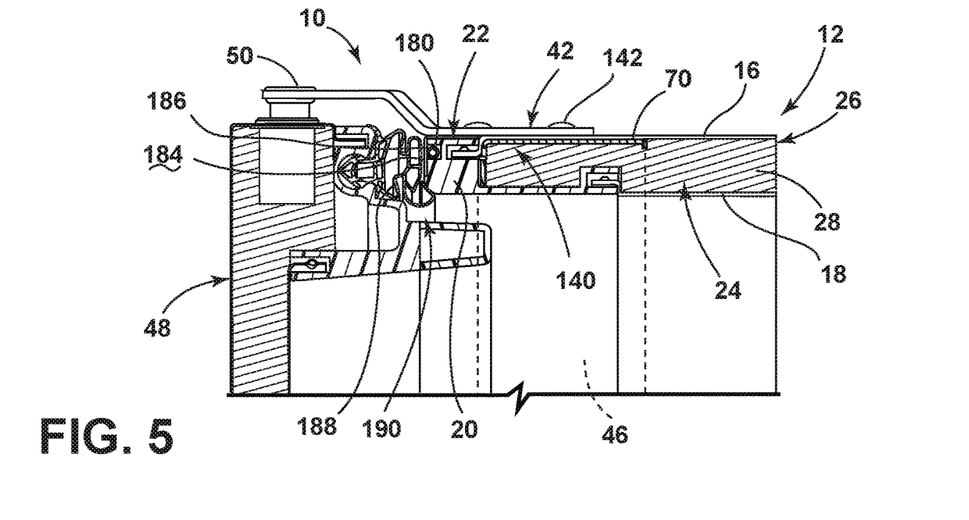
FIG. 5 is a cross-sectional view of the appliance of FIG. 1 taken along line V-V.
Figure 6:
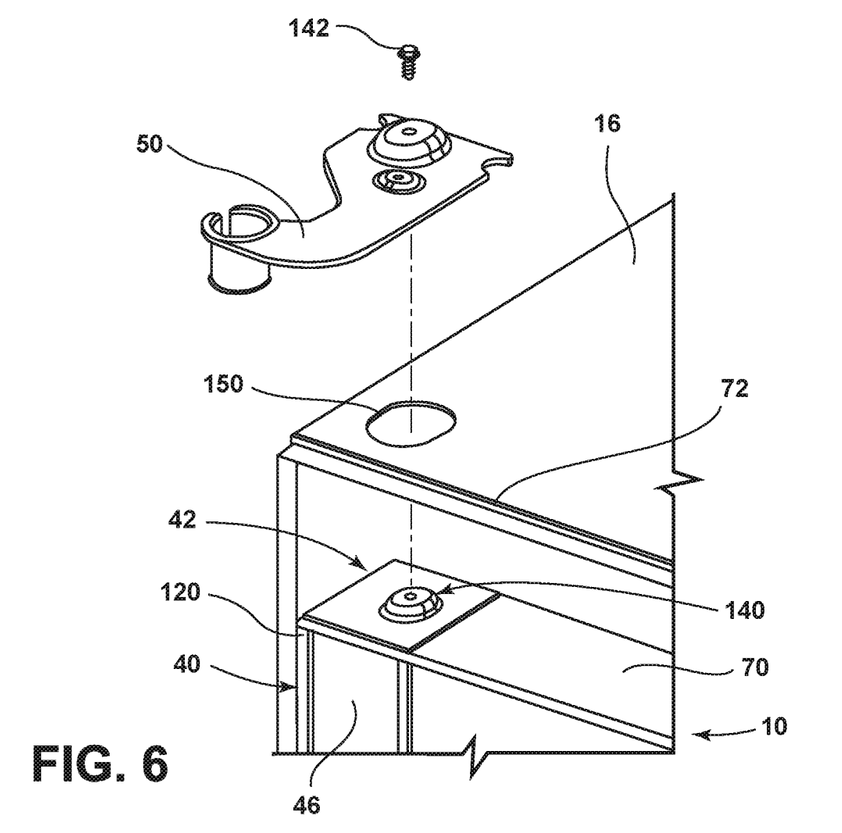
FIG. 6 is a partially exploded top perspective view of an upper hinge and upper hinge mount incorporated within an aspect of the hinge support frame.
Figure 7:
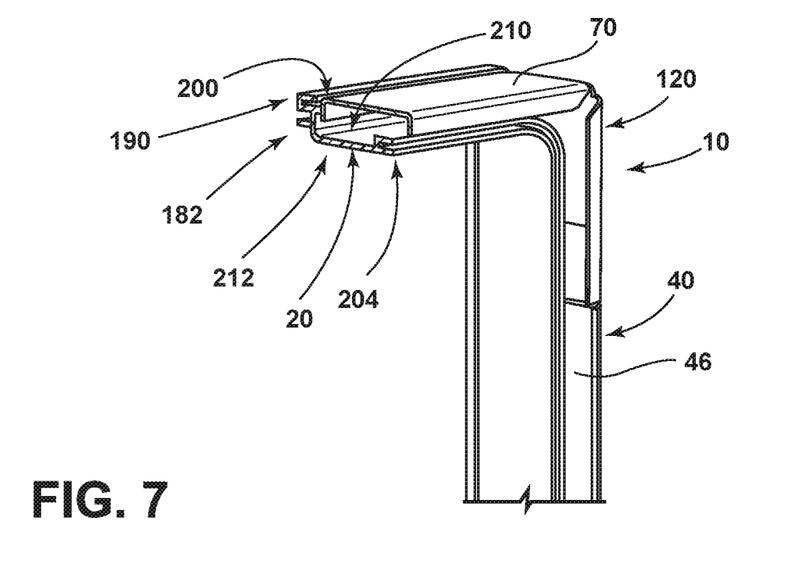
FIG. 7 is a cross-sectional perspective view of an aspect of the hinge support frame.
Figure 8:
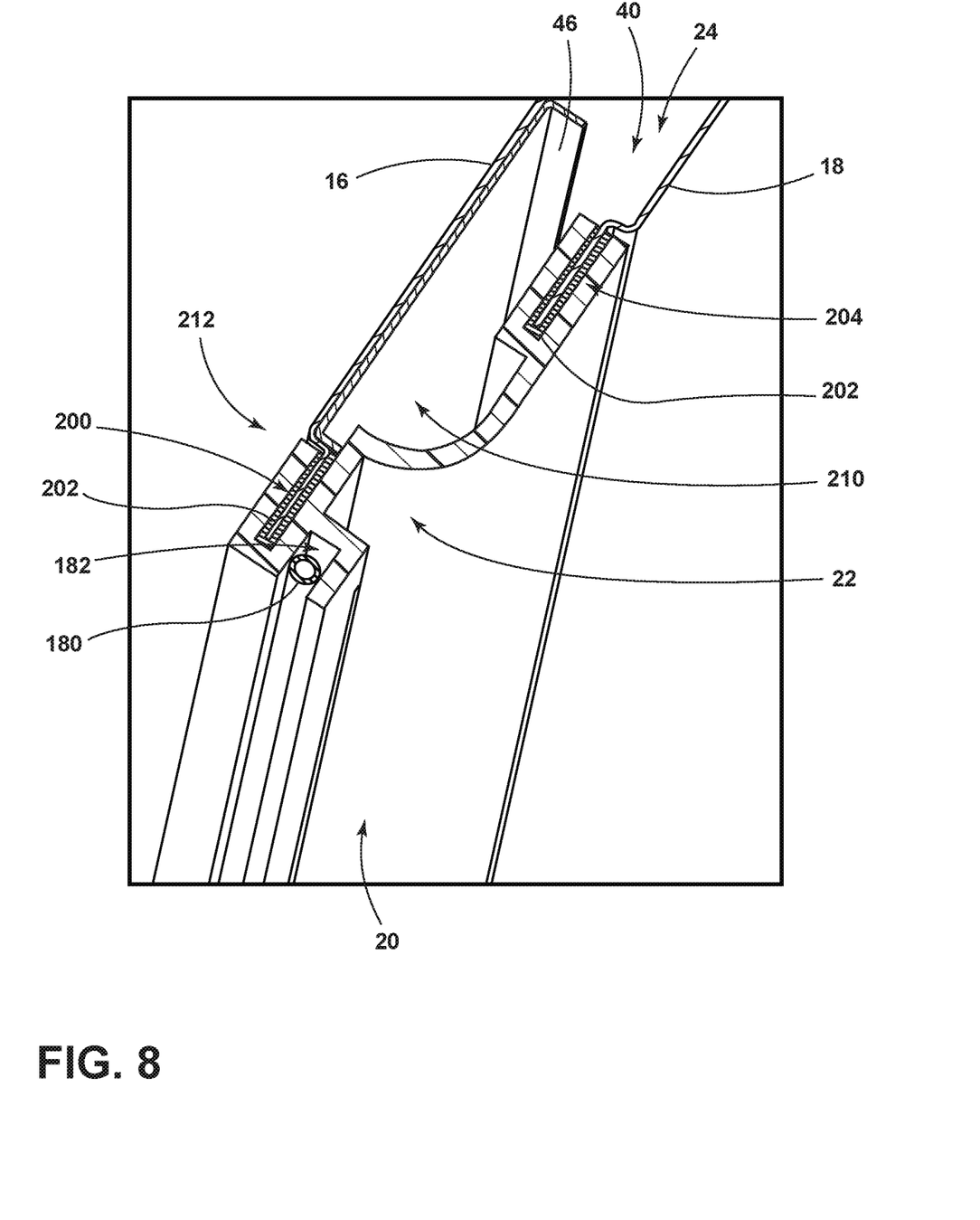
FIG. 8 is a cross-sectional perspective view of an aspect of a hinge breaker for the hinge support frame.
Figure 9:
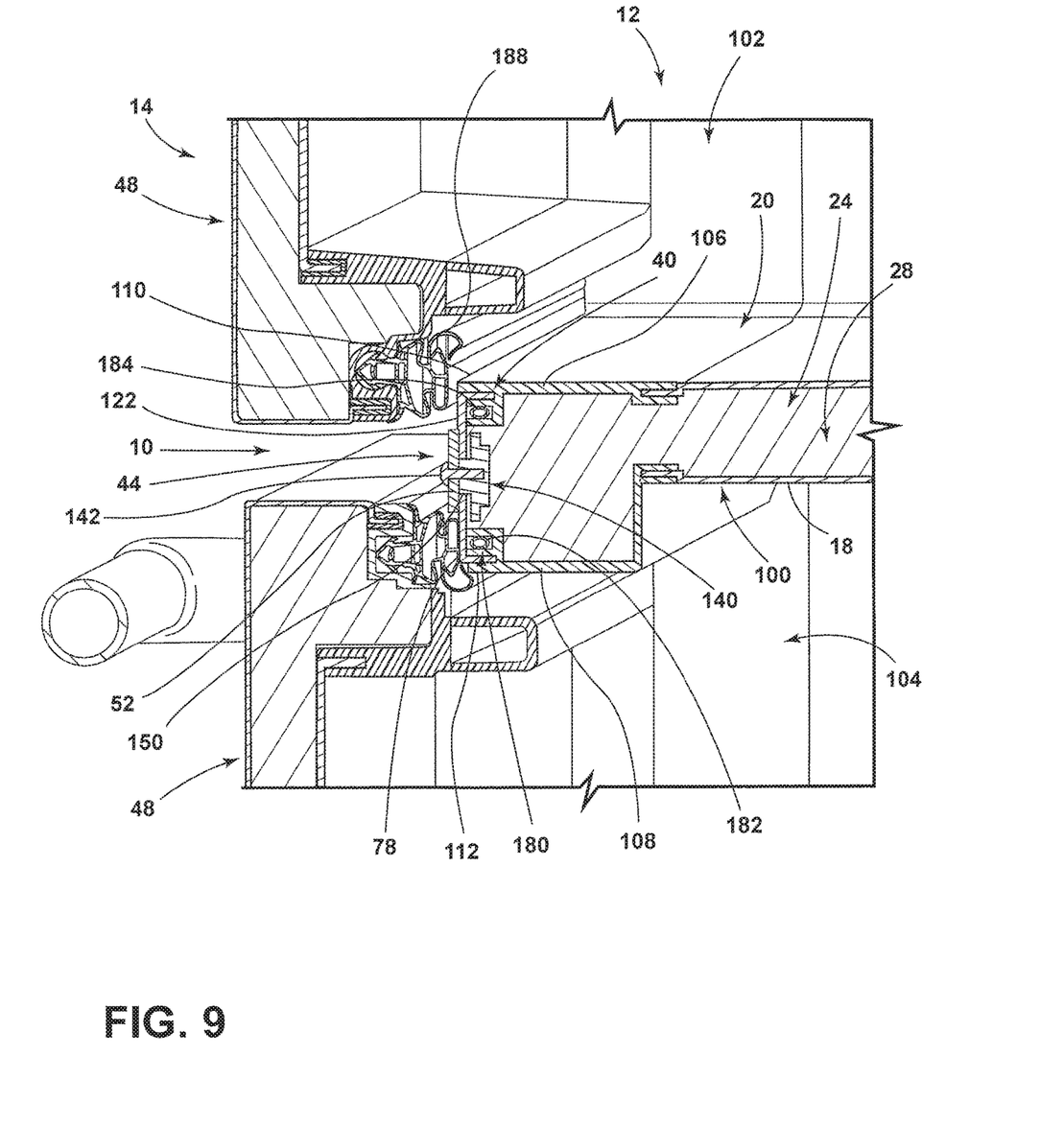
FIG. 9 is a cross-sectional view of the appliance of FIG. 4 taken at area IX.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-9, reference numeral 10 generally refers to a hinge support frame that is incorporated as part of a cabinet 12 for the appliance 14. The appliance 14 can include the cabinet 12, where the cabinet 12 includes an outer wrapper 16, an inner liner 18 and a trim breaker 20 that defines a joint 22 extending between portions of the outer wrapper 16 and inner liner 18. The outer wrapper 16, the inner liner 18 and the trim breaker 20 serve to define an insulating cavity 24 within the cabinet 12. A vacuum insulated structure 26 can be disposed within the insulating cavity 24. It is contemplated that the vacuum insulated structure 26 can be a vacuum insulated panel disposed within the insulating cavity 24. The vacuum insulated structure 26 can also be defined by an insulating material 28 disposed within the insulating cavity 24, where gas is expressed from the insulating cavity 24 to define an at least partial vacuum of the vacuum insulated structure 26.

Referring again to FIGS. 1-9, a metallic frame 40 is disposed in communication with the outer wrapper 16. The metallic frame 40 can include at least one upper hinge mount 42 and at least one lower hinge mount 44 that are connected by at least one vertical frame member 46. It is contemplated that the metallic frame 40 is at least partially disposed within the insulating cavity 24. According to various aspects, the entire metallic frame 40 can be disposed within the insulating cavity 24. At least one door 48 is rotationally mounted to the cabinet 12 via an upper hinge 50 attached to the at least one upper hinge mount 42 and a lower hinge 52 attached to the at least one lower hinge mount 44. The upper and lower hinge mounts 42, 44 receive downward forces 54 and rotational forces 56 exerted by the door 48 onto the cabinet 12. The upper and lower hinge mounts 42, 44 transfer these downward and rotational forces 54, 56 to the vertical frame member 46 and away from the trim breaker 20.

Referring again to FIGS. 3-9, it is contemplated that the metallic frame 40 can include an upper lateral frame member 70 that extends across a top edge 72 of the cabinet 12 and defines the at least one upper hinge mount 42. It is contemplated that the at least one upper hinge mount 42 can include a pair of upper hinge mounts 42 that are positioned proximate opposing left and right sidewalls 74, 76, respectively, of the cabinet 12. The metallic frame 40 can also include a lower lateral frame member 78 that defines the at least one lower hinge mount 44. It is contemplated that the at least one lower hinge mount 44 can include a pair of lower hinge mounts 44 that are positioned proximate the right and left sidewalls 76, 74, respectively, and in alignment with the pair of upper hinge mounts 42 to provide mounting locations for a pair of French doors 48 that are opposingly and rotationally operable between open and closed positions 80, 82. It is contemplated that the at least one vertical frame member 46 can include right and left vertical frame members 84, 86 that extend from the upper lateral frame member 70 and attach to the lower lateral frame member 78. According to the various embodiments, the various vertical frame members 46, including the right and left vertical frame members 84, 86, can extend from the top edge 72 of the cabinet 12 down to a base 88 of a cabinet 12 such that various loads placed upon the metallic frame 40 can be transferred to the base 88 of the appliance 14 and into feet or rollers of the appliance 14 to be transferred to the floor, ground, or other substrate surface.

According to the various embodiments, as exemplified in FIGS. 3-9, the inclusion of the metallic frame 40 and the upper and lower hinge mounts 42, 44 incorporated therein serve to provide hinge attachment points to which the various upper and lower hinges 50, 52 of the appliance 14 can be fixed and secured. In this manner, when doors 48 are attached to the upper and lower hinges 50, 52, the weight of the doors 48 is transferred to the metallic frame 40. In this manner, the weight of the doors 48 being received by the metallic frame 40 serves to direct the downward and rotational forces 54, 56 exerted by the doors 48 away from the trim breaker 20, the inner liner 18, and the insulating material 28 disposed within the insulating cavity 24. Accordingly, the weight of the doors 48 and the weight of contents placed within the doors 48 is directed to the metallic frame 40, such that these downward forces 54 applied by the doors 48 do not affect the structural integrity of the vacuum insulated structure 26 of the appliance 14.

According to the various embodiments, as exemplified in FIGS. 3-8, the upper lateral frame member 70 defines the pair of upper hinge mounts 42 to which the upper hinges 50 are attached. Forces exerted upon the upper hinge mounts 42 through the use and operation of the doors 48 of the appliance 14 are transferred through the upper hinge mounts 42 and into the upper lateral frame member 70. These forces are then transferred from the upper lateral frame member 70 to the various vertical frame members 46 and downward through the appliance 14 and away from the trim breaker 20 and the insulating material 28. It is contemplated that the metallic frame 40 can be integrated within support feet or rollers of the appliance 14 such that vertical forces are directed through the metallic frame 40 and to the base 88 of the appliance 14. It is also contemplated that the vertical forces can be directed through the metallic frame 40 and into a structural portion of the outer wrapper 16 that is adapted to receive such forces and direct such forces to a base 88 of the appliance 14.

Referring again to FIGS. 2-4 and 9, the cabinet 12 of the appliance 14 can include an interior mullion 100 that extends through a central portion 130 of the cabinet 12 and defines a plurality of interior compartments, such as an upper refrigerating compartment 102 and a lower freezing compartment 104 of the appliance 14, as an example. In such an embodiment, the lower lateral frame member 78 can be disposed within the interior mullion 100. It is also contemplated that the trim breaker 20 can also define a portion of the interior mullion 100. According to various embodiments, it is contemplated that the interior mullion 100 can include an upper trim breaker 106 and a lower trim breaker 108, where the lower lateral frame member 78 extends vertically between the upper and lower trim breakers 106, 108. In such an embodiment, it is contemplated that the upper trim breaker 106 can at least partially define an upper aperture 110 for defining the refrigerating compartment 102 and the lower trim breaker 108 can at least partially define the lower aperture 112 for defining the freezing compartment 104 of the appliance 14.

Referring again to FIGS. 2-4 and 9, the interior mullion 100 can be defined by the inner liner 18, the trim breaker 20, including the upper and lower trim breakers 106, 108, and the lower lateral frame member 78. The interior mullion 100 can be configured to extend laterally between portions of the outer wrapper 16 disposed proximate the left and right sidewalls 74, 76, respectively. It is contemplated that the vertical frame members 46 can attach to opposing ends 120 of the lower lateral frame member 78 to secure the vertical position of the lower lateral frame member 78 within the interior mullion 100. The lower lateral frame member 78 can include the one or more lower hinge mounts 44 within a front face 122 of the lower lateral frame member 78. As discussed above with respect to the upper hinge mounts 42, the lower hinge mounts 44 receive lower hinges 52 that serve to vertically and rotationally support the various doors 48 of the appliance 14 and contents disposed within the doors 48 of the appliance 14. The downward forces 54 and rotational forces 56 exerted by the door 48 onto the upper and lower hinges 50, 52 are transferred from the lower hinges 52 and into the lower lateral frame member 78. These forces are then transferred from the lower lateral frame member 78 to the right and left vertical frame members 84, 86 of the metallic frame 40. These forces can then be transferred through the right and left vertical frame members 84, 86 to a base 88 of the appliance 14 or out to structural portions of the outer wrapper 16 and then to the base 88 of the appliance 14.

According to the various embodiments, the right and left vertical frame members 84, 86 can extend from a top wall of the cabinet 12 proximate the upper hinge mounts 42 and can extend downward to the lower lateral frame member 78 and, in various embodiments, all the way to the base 88 of the cabinet 12. It is contemplated that the lower lateral frame member 78 can extend between the right and left vertical frame members 84, 86 and is attached at central portions 130 of the right and left vertical frame members 84, 86, respectively. Where the right and left vertical frame members 84, 86 extend only to the lower lateral frame member 78, the lower lateral frame member 78 attaches to bottom portions of the right and left vertical frame members 84, 86.

Referring again to FIGS. 3-9, it is contemplated that the insulating cavity 24 defined by the outer wrapper 16, inner liner 18 and trim breaker 20 can be a hermetically sealed cavity. It is also contemplated that the upper hinge mounts 42 and the lower hinge mounts 44 can include attachment receptacles 140 that serve to receive the upper and lower hinges 50, 52, respectively. Through this engagement, the attachment receptacles 140 are adapted to maintain the upper and lower hinges 50, 52 separate from the insulating cavity 24, which may be hermetically sealed. In this manner, when the upper and lower hinges 50, 52 are attached to the upper and lower hinge mounts 42, 44, fasteners 142 that extend through the upper and lower hinges 50, 52 and into the upper and lower hinge mounts 42, 44 extend into the attachment receptacles 140. Accordingly, the fasteners 142 are maintained separate from the hermetically sealed insulating cavity 24. Through this configuration, the use of fasteners 142 does not puncture, or otherwise damage the integrity of the vacuum insulated structure 26. Accordingly, the attachment receptacles 140 incorporated as part of the upper and lower hinge mounts 42, 44 can at least partially define the insulating cavity 24 of the cabinet 12.

Referring now to FIGS. 4-8, in the case of the upper hinge mounts 42, the upper lateral frame member 70 can be disposed within the insulating cavity 24 and can be directly attached to a portion of the outer wrapper 16. In this manner, the attachment receptacle 140 can be directly attached or integrated within a portion of the outer wrapper 16 proximate the upper hinge mounts 42. When the upper hinge 50 is attached to the attachment receptacles 140 of the upper hinge mounts 42, the attachment receptacles 140 may be visible through the outer wrapper 16. An attachment aperture 150 within the outer wrapper 16 proximate the upper hinge mount 42 allows for a portion of the attachment receptacle 140 to extend through the outer wrapper 16 to receive the fastener 142. The attachment receptacle 140 can be welded, adhered, or otherwise sealingly attached to a portion of the outer wrapper 16, such that the hermetic seal of the insulating cavity 24 is maintained during and after attachment of the upper hinge 50 to the upper hinge mount 42. When the various fasteners 142 are attached from the upper or lower hinge 50, 52 to the attachment receptacle 140, the various fasteners 142 can extend through a portion of the outer wrapper 16 and into the attachment receptacle 140. However, the fasteners 142 remain within the attachment receptacle 140 and do not penetrate into the insulating cavity 24. Accordingly, the upper lateral frame member 70 of the metallic frame 40 fixes the position of the upper hinge 50 and receives the downward and rotational forces 54, 56 exerted upon the upper hinge 50 by the door 48. These downward and rotational forces 54, 56 can then be transferred through the metallic frame 40 and kept away from other components of the cabinet 12 such as the trim breaker 20, inner liner 18 and insulating material 28. In this manner, the various downward and rotational forces 54, 56 transferred through the hinges and into the cabinet 12 are substantially transferred to the metallic frame 40 to maintain the integrity of the vacuum insulated structure 26 of the cabinet 12.

Referring again to FIGS. 4-8, it is contemplated that the inclusion of the metallic frame 40 within the insulating cavity 24 can also serve to reinforce the cabinet 12 at the edges 160 of the various sidewalls 162 of the cabinet 12 proximate the trim breaker 20. Accordingly, the metallic frame 40 can extend from the outer wrapper 16 to at least one of the inner liner 18 and trim breaker 20 to maintain the spacing and configuration of the outer wrapper 16, trim breaker 20 and inner liner 18 at the edges 160 of each sidewall 162 of the cabinet 12. As discussed above, this configuration serves to reinforce the sidewalls 162 and minimize the stresses exerted upon the trim breaker 20 and the inner liner 18 as a result of downward and rotational forces 54, 56 exerted upon the cabinet 12 by the door 48 of the appliance 14.

Referring again to FIGS. 4 and 9, similar to the upper hinge mount 42, the lower hinge mount 44 is integrated within the lower lateral frame member 78 and includes the attachment receptacles 140 for receiving fasteners 142 for attaching the lower hinges 52 to the lower hinge mounts 44. It is contemplated that the interior mullion 100 can include a vacuum insulated panel, or can define the vacuum insulated structure 26 through a hermetically sealed engagement between the trim breakers 20, inner liner 18 and lower lateral frame member 78. Again, the use of the attachment receptacles 140 can at least partially define the hermetically sealed insulating cavity 24 at the interior mullion 100. It is also contemplated that the interior mullion 100 can include a foamed-in insulating material 28 that is kept at atmosphere and is not hermetically sealed or pressurized. In such an embodiment, the use of the attachment receptacles 140 for sealing the engagement between the lower hinges 52 and the lower hinge mounts 44 is still effective at minimizing the transfer of gas and thermal energy through the attachment points defined by the lower hinge mounts 44. The attachment receptacles 140, as with the upper hinge mounts 42 are adapted to receive the fastener 142 for the lower hinges 52 and prevent the fasteners 142 from extending through the attachment receptacles 140, such that the fasteners 142 do not extend into the insulating cavity 24 within the interior mullion 100.

Referring again to FIGS. 3, 4 and 9, the implementation of the lower lateral frame member 78 for defining the lower hinge mounts 44 again serves to allow the lower lateral frame member 78 of the metallic frame 40 to receive the downward and rotational forces 54, 56 exerted upon the lower hinges 52 by the doors 48 of the appliance 14. This configuration serves to divert these forces away from the trim breakers 20 and inner liner 18 of the cabinet 12. Additionally, the lower lateral frame member 78 serves to maintain the spacing and configuration of the upper and lower trim breakers 106, 108 and the inner liner 18 of the cabinet 12. The metallic frame 40 also reinforces and provides additional structural integrity to the interior mullion 100 of the cabinet 12 to prevent deflection and damage as a result of deflection during use of the appliance 14.

Referring again to FIGS. 4-9, it is contemplated that the metallic frame 40 can be directly attached to the outer wrapper 16 of the cabinet 12. It is also contemplated that the metallic frame 40 can be incorporated as a thickened or reinforced portion of the outer wrapper 16. The thickening or reinforcement of the outer wrapper 16 can be accomplished through the addition of structural material at the portions described above or through folding over of the outer wrapper 16 to form thickened portions of the outer wrapper 16.

Referring again to FIGS. 4-9, the positioning of the metallic frame 40 serves to place the upper and lower hinge mounts 42, 44 at a position distal from the trim breakers 20 and inner liner of the appliance 14 to prevent the transfer of downward and rotational forces 54, 56 from the doors 48 and into these portions of the appliance 14. It is contemplated that the trim breaker 20 and inner liner 18 can be made of plastic, polymer, or other similar deflectable and potentially crackable material. Accordingly, the use of the metallic frame 40 which is adapted to receive downward and rotational forces 54, 56 exerted upon the cabinet 12 by the doors 48, can direct these forces through the metallic frame 40 and away from the trim breakers 20 and inner liner 18 of the appliance 14.

Referring again to FIGS. 4-9, the cabinet 12 can include the metallic frame 40 that defines the plurality of hinge mounts, such as the upper and lower hinge mounts 42, 44. The outer wrapper 16 can then be engaged with the metallic frame 40. The inner liner 18 serves to cooperate with the outer wrapper 16 to define an insulating cavity 24. The trim breaker 20 can then define a joint 22 between the inner liner 18 and outer wrapper 16. The metallic frame 40 is at least partially disposed within the insulating cavity 24 and serves to maintain the upper and lower hinge mounts 42, 44 distal from the trim breaker 20. The metallic frame 40 includes upper and lower lateral frame members 70, 78 that are connected by vertical frame members 46.

Referring again to FIGS. 3-9, the cabinet 12 of the appliance 14 can include the outer wrapper 16 and a metallic frame 40 that is disposed in at least partial engagement with the outer wrapper 16. The metallic frame 40 can serve to define a plurality of upper and lower hinge mounts 42, 44. The trim breaker 20 engages the outer wrapper 16 where the trim breaker 20 and metallic frame 40 are positioned to maintain the plurality of upper and lower hinge mounts 44, 46 distal from the trim breaker 20. The inner liner 18 serves to cooperate with the outer wrapper 16 and the trim breaker 20 to define the hermetically sealed insulating cavity 24 that defines an at least partial vacuum. As discussed above, the upper and lower hinge mounts 42, 44 are at least partially disposed within the insulating cavity 24 and are adapted to receive fasteners 142 for attaching the upper and lower hinges 50, 52. The upper and lower hinge mounts 42, 44 serve to receive the fasteners 142 in a manner that maintains the at least partial vacuum within the insulating cavity 24.

Referring again to FIGS. 3-9, the appliance 14 can include a heat loop 180 that is disposed within a loop channel 182 defined within a trim breaker 20 proximate a contact surface 184 of the cabinet 12. A door engagement member 186 can be attached to the trim breaker 20 and is configured to extend over the loop channel 182 to define the contact surface 184 of the cabinet 12. According to the various embodiments, the contact surface 184 is adapted to receive a door seal 188 of the various doors 48 of the appliance 14 when the doors 48 are in the closed position 82. It is contemplated that the contact surface 184 of the door engagement member 186 is placed in thermal communication with the heat loop 180. The heat loop 180 can include a conduit through which a thermal material is delivered for transferring heat from the heat loop 180 to the contact surface 184. This transfer of heat from the heat loop 180 to the contact surface 184 serves to minimize condensation forming on the contact surface 184 which may affect the sealing engagement between the door seals 188 and the cabinet 12. It is contemplated that the heat loop 180 can also include a resistive heat element that extends through the loop channel 182 defined within the trim breaker 20.

Referring again to FIG. 3, it is contemplated that the heat loop 180 can extend through each of the sidewalls 162 and also through a front portion 190 of the interior mullion 100 where various portions of the contact surface 184 engage door seals 188 for the appliance 14. The heat loop 180 can be defined by a continuous loop that extends proximate the contact surface 184.

Referring again to FIGS. 4-9, it is contemplated that the trim breaker 20 can include a wrapper channel 200 that serves to engage the outer wrapper 16 and extend around an edge of the outer wrapper 16. Accordingly, the wrapper channel 200 can include a sealing and/or adhesive material 202 that seals the engagement between the outer wrapper 16 and the trim breaker 20 at the wrapper channel 200 for defining a hermetic seal of the cabinet 12. Similarly, the trim breaker 20 can also include a liner channel 204 that receives a portion of the inner liner 18. The liner channel 204 can include a sealant and/or adhesive that receives and hermetically seals the inner liner 18 to the trim breaker 20 for defining the at least partial vacuum within the insulating cavity 24 of the cabinet 12.

Referring again to FIGS. 4-9, it is contemplated that the wrapper and liner channels 200, 204 of the trim breaker 20 can be placed in an offset configuration to define a frame recess 210 within which a portion of the metallic frame 40 can be disposed. In such an embodiment, the trim breaker 20 and metallic frame 40 within the frame recess 210 can define a reinforced trim breaker 212 that extends around the edges 160 of the sidewalls 162 of the cabinet 12. The placement of the metallic frame 40 within the frame recess 210 can also reinforce the positions and configuration of the outer wrapper 16 and inner liner 18 at the reinforced trim breaker 212.

Referring again to FIGS. 4-7, it is contemplated that the metallic frame 40 can include a unitary assembly that is formed from a shaped metallic formation. It is also contemplated that the upper and lower lateral frame members 70, 78 can be separate metallic members that are attached to the right and left vertical frame members 84, 86 through welding, fasteners 142, combinations thereof, or other similar attachment mechanisms.

According to the various embodiments, it is contemplated that the hinge support frame 10 described herein can be incorporated within various appliances that can include, but are not limited to, refrigerating appliances, freezers, humidors, ovens, laundry appliances, water heaters, various other household appliances and fixtures and other similar household and commercial applications.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An appliance comprising:
   a cabinet having a metallic frame that defines a plurality of hinge mounts that includes at least one upper hinge mount and at least one lower hinge mount;
   an outer wrapper that is engaged with the metallic frame;
   an inner liner that cooperates with the outer wrapper to define an insulating cavity;
   a trim breaker that defines a joint between the inner liner and outer wrapper, wherein the metallic frame is at least partially disposed within the insulating cavity and maintains the plurality of hinge mounts distal from the trim breaker, and wherein the metallic frame includes upper and lower lateral frame members that are connected by a vertical frame member;
   an interior mullion extending through a central portion of the cabinet and defining a plurality of interior compartments, wherein the lower lateral frame member is disposed within the interior mullion, and wherein the trim breaker defines a portion of the interior mullion;
   a heat loop disposed within a loop channel defined within the trim breaker proximate a contact surface of the trim breaker at the at least one upper hinge mount, wherein the lower lateral frame member extends over a portion of the heat loop and engages channels of upper and lower trim breakers of the interior mullion;
   a door panel rotationally mounted to the cabinet via hinges mounted to an upper hinge mount and a lower hinge mount of the plurality of hinge mounts; and
   a door engagement member that extends over the loop channel and defines the contact surface, wherein the contact surface receives a door seal of the door panel when the door panel is in a closed position, and wherein the contact surface of the door engagement member is in thermal communication with the heat loop, wherein the upper lateral frame member defines the at least one upper hinge mount;
   the lower lateral frame member defines the at least one lower hinge mount;
   the lower lateral frame member extends vertically between the upper and lower trim breakers of the interior mullion; and
   the lower lateral frame member includes at least one attachment receptacle positioned between the upper and lower trim breakers.

2. The appliance of claim 1, wherein the plurality of hinge mounts includes a pair of upper hinge mounts that are positioned proximate opposing left and right sidewalls, respectively, and a pair of lower hinge mounts that are positioned proximate the left and right sidewalls, respectively, and wherein the door panel partially defines a pair of French doors.

3. The appliance of claim 2, wherein the vertical frame member includes left and right frame members that are positioned within the insulating cavity proximate the left and right sidewalls, respectively.

4. The appliance of claim 3, wherein the left and right frame members extend from a top wall of the cabinet to a position proximate a base of the cabinet, wherein the lower lateral frame member extends between the left and right frame members and is attached at central portions of the left and right frame members, respectively.

5. The appliance of claim 1, wherein the trim breaker includes a wrapper channel that engages the outer wrapper with the trim breaker and a liner channel that engages the inner liner with the trim breaker.

6. A cabinet structure of an appliance, the cabinet structure comprising:
   an outer wrapper;
   a metallic frame disposed in at least partial engagement with the outer wrapper, the metallic frame defining a plurality of hinge mounts;
   a trim breaker that engages the outer wrapper, wherein the trim breaker is positioned to maintain a separation from the plurality of hinge mounts; and
   an inner liner that cooperates with the outer wrapper and the trim breaker to define a sealed insulating cavity defining an at least partial vacuum, wherein the plurality of hinge mounts are at least partially disposed within the sealed insulating cavity and receive hinge fasteners and maintain the at least partial vacuum of the sealed insulating cavity, wherein at least one upper hinge mount and at least one lower hinge mount of the plurality of hinge mounts include attachment receptacles that respectively receive the hinge fasteners, wherein the attachment receptacles receive the hinge fasteners through the plurality of hinge mounts and also define a portion of the sealed insulating cavity to maintain the hinge fasteners separate from the sealed insulating cavity.

7. The cabinet structure of claim 6, wherein the plurality of hinge mounts of the metallic frame includes at least one upper hinge mount and at least one lower hinge mount that are connected by at least one vertical frame member, wherein the metallic frame is at least partially disposed within the sealed insulating cavity.

8. The cabinet structure of claim 6, wherein the attachment receptacles at least partially define the sealed insulating cavity.

* * * * *